Patented Jan. 31, 1928.

1,657,573

UNITED STATES PATENT OFFICE.

HENRY B. HANLEY, OF ROCHESTER, NEW YORK, ASSIGNOR TO WHITEHEAD BROTHERS COMPANY, OF NEW YORK, N. Y., A CORPORATION OF NEW JERSEY.

MOLDING COMPOUND.

No Drawing.  Application filed July 1, 1924. Serial No. 723,451.

My invention has for its object the production of a compound adapted for use as a molding sand which might be termed a "synthetic" molding sand and which shall possess all the desirable properties inherent in natural molding sands such as permeability, to allow the free escape of gas and air, refractoriness, or the ability to withstand the high temperatures of molten metal, and bond or cohesiveness, so that when the mold is made it will be sufficiently strong to withstand the cutting action and pressure of the incoming molten metal.

The invention further relates to the treatment of molding sands, either synthetic or natural molding sands, in such manner as to rejuvenate, renovate or improve them and thereby restore or give to them the necessary properties making them adapted for and capable of performing their molding function.

Briefly stated my invention consists in combining or mixing bentonite with an ordinary unbonded silicious sand and in some cases also combining clay therewith. The invention also consists in treating molding sand with this material, so that when water is added to the compound a plastic composition will result which will contain all the requisite properties of molding sands.

The material, bentonite, may be found in its natural state in certain parts of the State of Wyoming as well as in other localities and it is sometimes known by other names. It comprises a clay-like material containing a large percentage of silica and a comparatively large percentage of alumina, the balance of the composition comprising ingredients of a low-grade clay such as lime, magnesia, iron oxide, sodium oxide, and potassium oxide. In so far as I have been able to determine the alumina and silica in the material combined as aluminum silicate, is in free hydrated form in highly colloidal condition. This material will be found to have a high dye-test figure of a minimum of 25,000, the dye-test being a test now well known in the art of clays and clayey materials for measuring the relative colloid content therein. The dye phenomenon is purely physical in that the colloidal surfaces adsorb from an aqueous dye solution certain quantities of dye depending upon the amount of colloidal material present. A high dye-test shows a large amount of colloidal matter in the material and in so far as I am aware no clay or clay-like material heretofore used for the purposes of my invention has shown a higher dye-test figure than 12,000. If a clayey material shows a high dye-test figure it will probably be highly plastic when mixed with water and therefore contains one of the necessary properties for molding purposes. The dye adsorption test is described in detail in a paper under "Dye adsorption test" presented to the American Foundrymen's Association in May, 1923, at Cleveland, Ohio, and may be seen in the transactions of said association for 1923.

It will be understood that chemical analyses of bentonite may vary somewhat depending, among other things, on the locality from which it is obtained but for the purposes of my invention I have found that it is exceedingly efficacious and capable of performing its intended function if it contains approximately 20% of alumina ($Al_2O_3$) and 63% of silica ($SiO_2$), the aluminum silicate being free and hydrated as well as being in highly colloidal condition as hereinbefore stated and the balance of the material containing ingredients of a low-grade clay. It will be understood, however, that I do not wish to limit myself to the exact proportions stated as they may be varied and they are merely illustrative of a material within the scope of my invention which will accomplish or effect the results desired. If the proportions of the ingredients vary the amount of bentonite to be used for the purposes of my invention may be determined by experimentation.

For molding grey iron, malleable iron and brass I have found that a mixture of grain or unbonded sand together with clay and bentonite with a proper amount of water added to give the mixture the desired cohesiveness, to be a desirable compound. In practice a compound having approximately 90% grain or unbonded sand, 5% clay and 5% bentonite has been found to give good results, the percentage being by weight. These percentages might be varied considerably without departing from the spirit of my invention and will vary depending on the quality of grain or unbonded sand used and on the quality of the bentonite.

Bentonite used according to my invention is such a strong binder that it will impart the necessary amount of strength to the resultant synthetic molding sand just described even though it be used in as small quantities as 5% or less. Moreover, it will not seriously impair the venting qualities (permeability) of the resultant sand. It also causes the clay to adhere to each individual sand grain to an extent which will prevent them from easy separation from one another when the resultant sand is handled or moved.

Another exceedingly desirable characteristic of bentonite when used according to my invention is the one known as its absorptive property when water is added thereto. Having this characteristic it absorbs several times its own weight in water and in doing so it swells up an appreciable extent and to several times its original bulk and becomes a jelly-like mass. No other clay-like material of which I have knowledge has these properties. After the ingredients heretofore stated have been mixed together to produce a synthetic molding sand and water is added to temper up the mixture and make it sufficiently plastic for molding grey iron, malleable iron and brass, each minute particle of bentonite which is attached to any sand grain will swell up an appreciable extent and spread over the grain in the form of a sticky, gelatinous film. This will cause each grain to effectively adhere to its adjacent grains. Furthermore, the thin liquid film does not fill up the voids between the grains and leaves the resultant sand permeable to gases.

In the case of molding sand for steel, the use of a silica sand as is well known is desirable because of its ability to resist the high temperature of the molten metal. It is customary at present to mix the silica sand with a certain amount of clay and then add an effective organic binder such as molasses, dextrine or flour, it being found in practice that an inorganic binder usually does not possess sufficient strength to properly perform its intended function. Inasmuch as an organic binder is susceptible to deterioration it is impractical to ship the molding sand ready for use to the foundry which makes it necessary for the foundryman to prepare and mix his own sand. This consumes a certain amount of time and it is expensive because of the cost of labor. By the use of bentonite or of a material having similar properties a very strong and suitable binder is provided which, being an inorganic binder, obviates the objections referred to. Furthermore, when bentonite is used as a binder because of its strength and other characteristics a comparatively small amount of clay is required in the composition, thereby permitting a larger percentage of silica sand. This increases the refractoriness of the composition and adds to the smoothness of the resulting steel casting.

From the above description of the properties of bentonite it will be readily understood that it may be used advantageously in many cases in the treatment of molding sand, either natural or synthetic sands, by merely mixing an amount therewith sufficient to give the sand cohesiveness and other desirable and necessary molding properties.

In the specification and appended claims the generic term "unbonded sand" will be used in its generic sense and will be understood to include sands or gravels that occur in nature in various forms of deposit such as lake sands, river sands, beach sands, bank sands and others and those which can be produced or obtained by crushing or otherwise reducing rock formations to the desired grain size, such unbonded sands either not possessing any bonding material or else possessing a bonding material in such slight quantity as to make them unsuitable for the molding of metals.

The generic term "clay" will also be understood to mean that material as it is commonly known and also fire-clay, loam and other analogous materials or a combination thereof.

What I claim as my invention is:—

1. A molding compound including an unbonded sand and bentonite.

2. A molding compound comprising an unbonded sand, clay and bentonite.

3. A molding compound comprising the following materials in substantially the proportions stated by weight: 90% of unbonded sand, 5% of clay and 5% of bentonite.

4. A molding compound comprising an unbonded sand and a plastic, clay-like material having a dye-test figure of a minimum of 25,000.

5. A molding compound comprising an unbonded sand and a clay-like material adapted to swell up to several times its original bulk when water is added thereto to form a sticky liquid whereby the sand grains will adhere to one another while at the same time leaving the resultant sand permeable to gases.

6. A molding compound comprising sand and bentonite.

7. A molding compound comprising sand and a clay-like material acting as a binder and having a dye-test figure of a minimum of 25,000.

Signed at Rochester in the county of Monroe and State of New York this 27th day of May, A. D. 1924.

HENRY B. HANLEY.